United States Patent
Aksit et al.

(10) Patent No.: US 10,515,456 B2
(45) Date of Patent: Dec. 24, 2019

(54) SYNTHESIZING HAIR FEATURES IN IMAGE CONTENT BASED ON ORIENTATION DATA FROM USER GUIDANCE

(71) Applicant: Adobe Inc., San Jose, CA (US)

(72) Inventors: Duygu Ceylan Aksit, Mountain View, CA (US); Zhili Chen, San Jose, CA (US); Jose Ignacio Echevarria Vallespi, San Jose, CA (US); Kyle Olszewski, Los Angeles, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/928,520

(22) Filed: Mar. 22, 2018

(65) Prior Publication Data

US 2019/0295272 A1    Sep. 26, 2019

(51) Int. Cl.
*G06T 7/50* (2017.01)
*G06T 15/04* (2011.01)
*G06K 9/00* (2006.01)
*G06T 7/529* (2017.01)

(52) U.S. Cl.
CPC .......... *G06T 7/529* (2017.01); *G06K 9/00281* (2013.01); *G06T 15/04* (2013.01)

(58) Field of Classification Search
CPC combination set(s) only.
See application file for complete search history.

(56) References Cited

U.S. PATENT DOCUMENTS

| | | | |
|---|---|---|---|
| 10,217,244 B2* | 2/2019 | Kowalczyk | G06K 9/00281 |
| 10,255,681 B2* | 4/2019 | Price | G06T 7/194 |
| 2012/0075331 A1* | 3/2012 | Mallick | G06T 11/001 345/594 |
| 2013/0021460 A1* | 1/2013 | Burdoucci | A45D 44/005 348/77 |
| 2018/0091732 A1* | 3/2018 | Wilson | G06F 3/048 |

OTHER PUBLICATIONS

Beeler, Thabo, "Coupled 3D Reconstruction of Sparse Facial Hair and Skin", ACM Trans. Graphics, vol. 31, No. 4, Article 117, Jul. 2012, 10 pages.

Upchurch, Paul, "Deep Feature Interpolation for Image Content Changes" CVP, Computer Vision Foundation , Jun. 2017, 10 pages.

* cited by examiner

*Primary Examiner* — Wesner Sajous
(74) *Attorney, Agent, or Firm* — Kilpatrick Townsend & Stockton LLP

(57) ABSTRACT

Certain embodiments involve synthesizing image content depicting facial hair or other hair features based on orientation data obtained using guidance inputs or other user-provided guidance data. For instance, a graphic manipulation application accesses guidance data identifying a desired hair feature and an appearance exemplar having image data with color information for the desired hair feature. The graphic manipulation application transforms the guidance data into an input orientation map. The graphic manipulation application matches the input orientation map to an exemplar orientation map having a higher resolution than the input orientation map. The graphic manipulation application generates the desired hair feature by applying the color information from the appearance exemplar to the exemplar orientation map. The graphic manipulation application outputs the desired hair feature at a presentation device.

20 Claims, 6 Drawing Sheets
(3 of 6 Drawing Sheet(s) Filed in Color)

SYNTHESIZING HAIR FEATURES IN IMAGE CONTENT BASED ON ORIENTATION DATA FROM USER GUIDANCE

TECHNICAL FIELD

This disclosure relates generally to computer-implemented methods and systems for computer graphics processing. Specifically, the present disclosure involves synthesizing image content depicting facial hair or other hair features based on orientation data obtained using guidance inputs or other user-provided guidance data.

BACKGROUND

Certain graphic manipulation applications are used to modify images depicting humans or other figures so that, for example, the features of a person's face are modified. For instance, a graphic manipulation application could modify one or more colors on a person's face, change the size of certain facial features, etc. But existing graphic manipulation applications involve limitations with respect to modifying hair features, such as facial hair or other image content depicting hair.

For instance, multiple images of a particular subject (i.e., a person with facial hair) could be used to generate a three-dimensional ("3D") reconstruction of that subject's facial hair. The 3D reconstruction is then modified to change the appearance of individual hair strands. But accurately modeling hair through a 3D reconstruction of hair is difficult if a set of images (as opposed to a single image) is unavailable for the particular subject, and editing a 3D model generated from the 3D reconstruction is a time-consuming, laborious task. In another example, a deep neural network used by a graphic manipulation application is trained to learn how to encode different facial features (e.g., facial hair, age, expression etc.) into a feature space. The graphic manipulation application can be used to edit features within the feature space and thereby generate hair features for an image. But editing these vector-based features is not intuitive for an end user, and the resultant facial hair often lacks realism or other desirable details due to insufficient training data.

Therefore, existing solutions may involve disadvantages for reasons such as (but not limited to) those described above.

SUMMARY

Certain embodiments involve synthesizing image content depicting facial hair or other hair features based on orientation data obtained using guidance inputs or other user-provided guidance data. For instance, a graphic manipulation application accesses guidance data identifying a desired hair feature and an appearance exemplar having image data with color information for the desired hair feature. The graphic manipulation application transforms the guidance data into an input orientation map. The graphic manipulation application matches the input orientation map to an exemplar orientation map having a higher resolution than the input orientation map. The graphic manipulation application generates the desired hair feature by applying the color information from the appearance exemplar to the exemplar orientation map. The graphic manipulation application outputs the desired hair feature at a presentation device.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1:
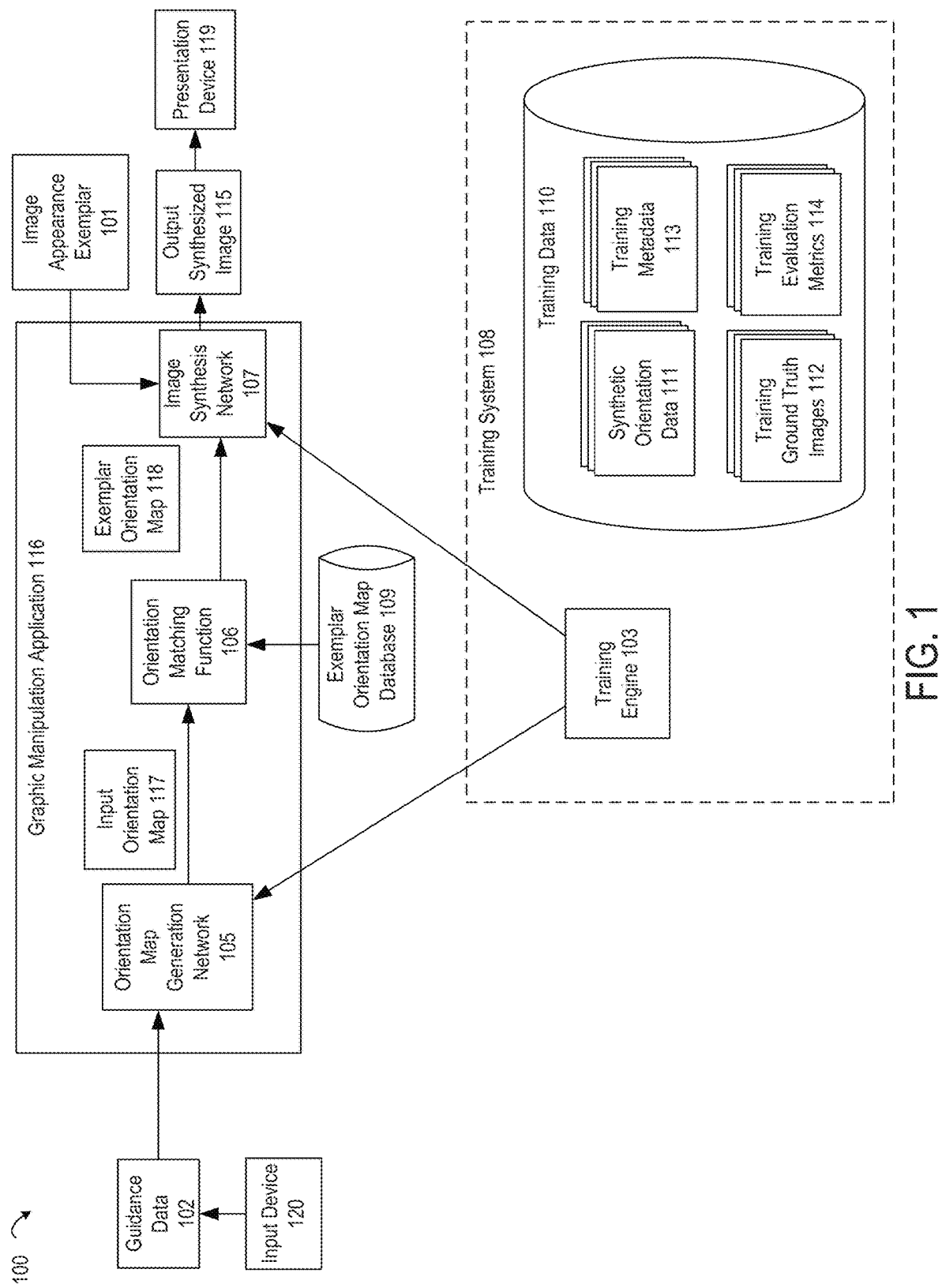
FIG. 1 depicts an example of a computing environment for synthesizing image content with hair features by using an image synthesis neural network, according to certain embodiments of the present disclosure.

The present disclosure includes systems and methods for synthesizing image content depicting facial hair or other hair features based on orientation data obtained using guidance inputs or other user-provided guidance data. As discussed above, existing image-processing techniques cannot accurately synthesize hair features in image content without modeling the hair of a specific individual depicted in multiple exemplar images of that specific individual. Certain embodiments described herein address these limitations by matching, via an image synthesis neural network, user-provided guidance input to a previously generated, high-resolution orientation map. A graphic manipulation application generates a desired hair feature for image content by adding relevant color detail to high-resolution orientation data obtained from a combination of the selected orientation map and guidance data. Because the orientation map includes a smaller amount of data, such as orientations of different hair strands rather than various color and lighting data depicting the hair strands themselves, the orientation map can be generated more easily for use by the graphic manipulation application as compared to complete models of hair features. Thus, using this high-resolution orientation map as the basis for a desired hair feature can allow high-quality hair features to be efficiently generated from a few high-level guidance inputs without relying on existing images of a desired hair feature.

The following non-limiting example is provided to introduce certain embodiments. In this example, a graphic manipulation application obtains guidance data identifying a desired hair feature. For instance, the guidance data could be an outline drawn on a digital canvas to depict the shape of a beard, a set of strokes drawn on the digital canvas to depict the texture of the beard, or some combination thereof. The graphic manipulation application also accesses an appearance exemplar, which includes image data having color information for the desired hair feature. For instance, the graphic manipulation application could receive a user input selecting an image that depicts a patch of brown hair, where the image is used as the appearance exemplar. The graphic manipulation application applies an orientation map generation neural network to generate an input orientation map, which represents the guidance input as a low-resolution set of orientation data. The orientation map generation network is trained to encode drawing inputs or other guidance inputs as low-resolution data and to match a higher-resolution orientation map to the low-resolution data.

Continuing with this example, the graphic manipulation application matches the input orientation map generated from the guidance input to an exemplar orientation map having a higher resolution than the input orientation map. The exemplar orientation map is a digital two-dimensional ("2D") model that includes, for each pixel or other image portion, data indicating an orientation of a strand of hair. The selected exemplar orientation map is retrieved from a set of exemplar orientation maps, which can be generated from user inputs specifying desired hair features, without having to account for any particular subject's facial features. In this manner, an intuitive guidance input (e.g., a few strokes sketching a beard) can be matched to a high-resolution model that closely matches the desired hair feature indicated by the guidance strokes. To generate the desired hair feature, the graphic manipulation application applies color information from the appearance exemplar to the exemplar orientation map. For instance, the graphic manipulation application generates a particular image patch of the desired hair feature by modifying the color information to depict an orientation indicated by a corresponding patch of the exemplar orientation map. The generated hair feature is outputted on a display device, either in isolation or applied to an image of a subject individual.

As used herein, the term "hair feature" is used to refer to electronic image data depicting a set of strands, such as facial hair, hair on a person's head, hair on another body part, hair on an animal, etc. Various embodiments are described herein as being used to synthesize image content depicting human hair. But other examples that depict hair on other animals or other strand-based features (e.g., wheat, grass, etc.) may be implemented in accordance with embodiments described herein.

As used herein, the term "guidance data" is used to refer to data identifying one or more visual characteristics of a desired hair feature. In some embodiments, the guidance data is a drawing input, such as the outline of a hair feature, strokes depicting the texture of a hair feature, etc. But other implementations are possible. For instance, other examples of guidance data include a selection of an existing shape (e.g., existing drawings identifying hair features), a selection of a low-resolution image of a certain hair feature, an outline extracted from an image or graphic using an edge-detection algorithm, etc.

As used herein, the term "orientation data" is used to refer to data indicating a direction in which a strand in a hair feature is oriented. In some embodiments, orientation data is included in an orientation map. An orientation map includes a set of orientation for an image, where a given pixel or other image portion is associated with a subset of the orientation data that indicates an orientation of a strand portion to be depicted at that pixel or image portion.

As used herein, the term "color information" is used to refer to any data used to render a certain appearance on a display device. Examples of color information include color values in a color space, lighting or other stylization parameter values, etc.

As described herein, certain embodiments provide improvements in image processing by automatically applying various rules of a particular type, such as transformation and matching operations performed by an image synthesis neural network. For example, these embodiments automatically match lower-quality sketches or other guidance inputs that a user could provide with an input device to high-quality orientation data that matches a desired feature indicated by the guidance inputs. These embodiments allow high-resolution versions of hair features to be generated automatically, without relying on a human being to painstakingly define every desired strand of hair and thereby automating certain subjective, manual actions by overcoming the limitations of existing hair-synthesis techniques (e.g., models that rely on large sets of training images depicting the particular person for which hair is to be synthesized). Thus, embodiments described herein improve computer-implemented processes for generating artificial hair features in image content, thereby providing a more suitable solution for automating tasks previously performed by humans.

Referring now to the drawings, FIG. 1 depicts an example of a computing environment for synthesizing image content with hair features by using an image synthesis network 107. The computing environment 100 includes one or more processing devices that execute a graphic manipulation application 116 and a training system 108 that provides a trained image synthesis network 107 used by the graphic manipulation application 116.

For example, the graphic manipulation application 116 receives guidance data 102 indicating a desired orientation of a hair feature. In some embodiments, the guidance data 102 may be user input guide strokes from an input device 120. In other embodiments, the guidance data 102 may be an outline of a desired hair feature.

In some embodiments, the graphic manipulation application 116 applies an orientation map generation network 105 (or other suitable operation) to generate an input orientation map 117 from guidance data 102. The orientation map generation network 105 is a trained neural network provided by training engine 103. Transforming the guidance data 102 could include, for example, applying a gradient computation operation to the guidance data. An input orientation map 117, which may not have a high resolution, includes orientation information of a hair feature. The orientation information represents the structure of a hair feature by encoding the orientation of individual hair strands.

The graphic manipulation application 116 uses an orientation matching function 106 to perform comparison of the input orientation map 117 to multiple exemplar orientation maps 118. The orientation matching function 106 matches an input orientation map 117 to a closest matching exemplar orientation map 118. For instance, the graphic manipulation application 116 accesses an exemplar orientation map database 109 and retrieves an exemplar orientation map 118 that is similar to the input orientation map 117. An exemplar orientation map 118 is a synthetic orientation map of a higher resolution than the input orientation map 117. The exemplar orientation map 118 includes orientation data corresponding to a desired hair feature.

The orientation matching function 106 searches for the closest match of an input orientation map 117 to an existing exemplar orientation map 118 in exemplar orientation map database 109 that stores exemplar orientation map database 109 contains multiple exemplar orientation maps 118. In some embodiments, exemplar orientation map database 109 is internal to graphics manipulation application 116. In additional or alternative embodiments, exemplar orientation map database 109 is remotely accessed by graphics manipulation application 116.

In some embodiments, the orientation matching function 106 involves computing a feature vector from the input orientation map 117, comparing this feature vector to feature vectors computed from exemplar orientation maps in the exemplar orientation map database 109, and selecting a sufficiently similar exemplar orientation map 118. The sufficient similarity can be determined based on a distance between feature vectors in a suitable vector space (e.g., a Euclidean distance). For instance, a sufficiently similar exemplar orientation map 118 could be the exemplar orientation map having a feature vector with the smallest distance (or a distance within a specified threshold) from the feature vector for the input orientation map 117.

In an image synthesis stage, an image synthesis network 107 receives the exemplar orientation map 118 as an input and also receives an image appearance exemplar 101 (e.g., an exemplar hair color image) as an input. The orientation matching function 106 provides the exemplar orientation map 118 to image synthesis network 107. The image synthesis network 107 also accesses the image appearance exemplar 101 (e.g., an image selected or otherwise provided using inputs from the input device 120). In some embodiments, the training system 108 provides a trained image synthesis network 107 to the graphic manipulation application 116.

The image synthesis network 107 performs operations that combine the exemplar orientation map 118 with the image appearance exemplar 101. The style of the image appearance exemplar 101 (e.g., color) is used to synthesize the hair based on orientation data from the exemplar orientation map 118. The image synthesis network 107 computes, for the image appearance exemplar 101, a corresponding orientation map. For instance, given a color facial hair image, a corresponding orientation map can be generated by image gradient computation type of methods. The image synthesis network 107 generates an output synthesized image 115 having the desired hair image. Additional details of embodiments of these operations are discussed in relation to FIG. 4.

The graphic manipulation application 116 transmits the output synthesized image 115 to presentation device 119. A presentation device 119 can include any device or group of devices suitable for providing visual, auditory, or other suitable sensory output. Non-limiting examples of the presentation device 119 include a touchscreen, a monitor, a speaker, a separate mobile computing device, etc.

The orientation map generation network 105 is trained by training system 108 comprising a training engine 103 and training data 110. Training engine 103 provides a trained orientation map generation network 105 to the graphic manipulation application 116. In some embodiments, the training data may include synthetic orientation data 111. The synthetic orientation data 111 in the training system 108 is a large set of synthetic orientation maps. The training data 110 may also include training ground truth images, which can be complete color images of hair features. In additional or alternative embodiments, the training data 110 may include training evaluation metrics such as, for example, an L1 pixel-wise loss, a Visual Geometry Group ("VGG") network feature loss, or a generative adversarial network ("GAN") loss, as described herein with respect to FIG. 4. In some embodiments, the training data 110 may further include training metadata 113. Training metadata 113 may be descriptors of possible guidance data 102 that generally describe hair features. For a non-limiting example, the metadata descriptors may be "fuzzy", "curly", or "bushy" or other terms, which describe appearance of hair features. Additional types of metadata can be used in the same manner.

In one example, the training system 108 selects various training input orientation maps from the synthetic orientation data 111 and training appearance exemplars. The training system 108 iteratively performs various training operations using this training data. For instance, with respect to a particular training input orientation map and training appearance exemplar, the training system 108 generates a training hair feature by matching a training exemplar orientation map to the training input orientation map and applying color information from the training appearance exemplar to training orientation data. The training input orientation map is obtained from the training exemplar orientation map, either directly or from an interim orientation map that is a modified version of the training exemplar orientation map. The training system 108 computes one or more loss metrics for the training hair feature. One example of a loss metric is a realism metric, such as a generative adversarial network ("GAN") loss, indicating a realism of the training hair feature. Another example of a loss metric is a color similarity metric, such as an L1 loss, indicating a color similarity between the training hair feature and an exemplar hair feature. Another example of a loss metric is a feature similarity metric, such as a Visual Geometry Group ("VGG") network feature loss, indicating a similarity of features between the training hair feature and the exemplar hair feature. The training system 108 modifies the orientation map generation network 105 to reduce or otherwise optimize the one or more loss metrics. The training system 108 outputs the orientation map generation network 105, as modified by the iteratively performed training operations, to the graphic manipulation application 116.

Figure 2:
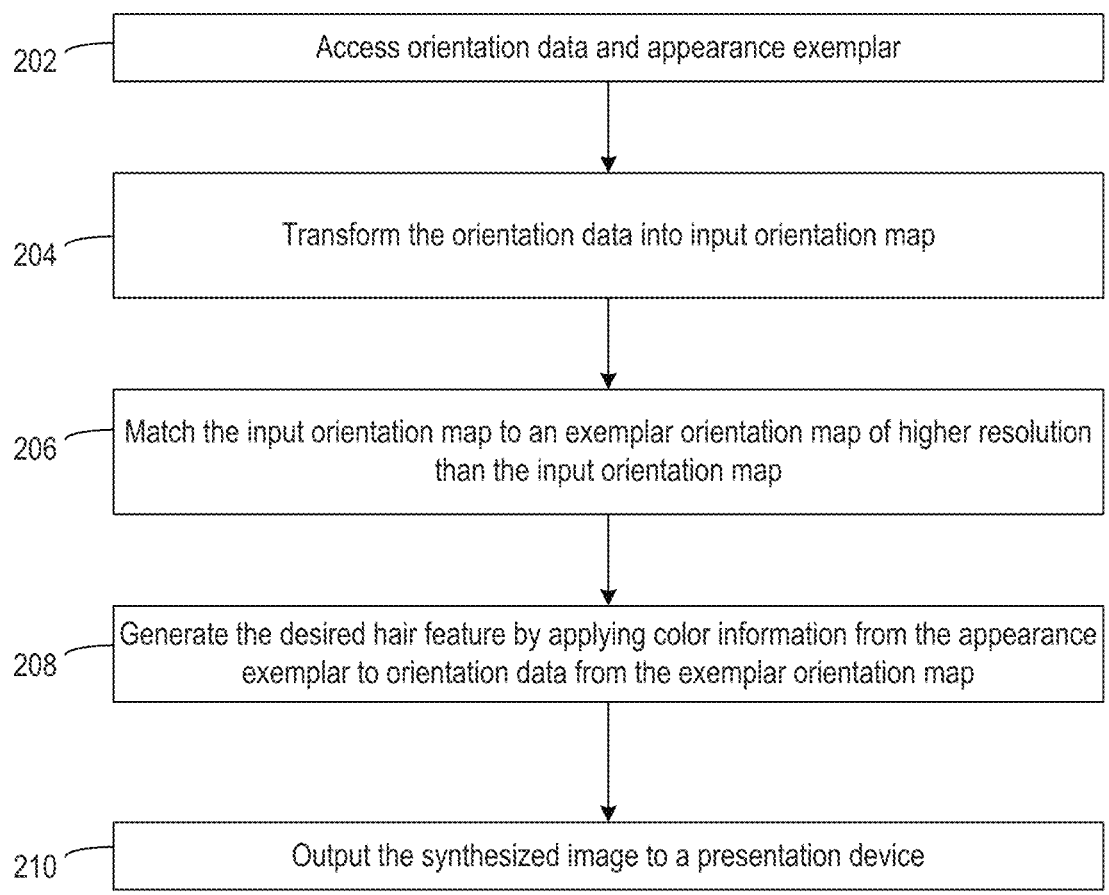
FIG. 2 depicts an example of a process used by the system in FIG. 1 for generating image content depicting facial hair or other hair features by applying an orientation-estimating neural network to guidance inputs or other user-provided guidance data, according to certain embodiments of the present disclosure.

FIG. 2 depicts an example of a process 200 for generating image content depicting facial hair or other hair features by applying an orientation-estimating neural network to guidance inputs or other user-provided guidance data 102, according to certain embodiments of the present disclosure. One or more computing devices (e.g., the computing environment 100) implement operations depicted in FIG. 2 by executing suitable program code (e.g., the graphics manipulation application 116). For illustrative purposes, the process 200 is described with reference to certain examples depicted in the figures. Other implementations, however, are possible.

At block 202, the process 200 involves accessing guidance data 102 and an image appearance exemplar 101. One or more computing devices execute program code from the graphics manipulation application 116 to implement block 202. For instance, the graphic manipulation application 116 accesses an image appearance exemplar 101 and guidance data 102. In some embodiments, an image appearance exemplar 101 may be a picture with RGB color information.

The graphics manipulation application 116 receives the image appearance exemplar 101 and guidance data 102 from a user input. For example, guidance data 102 may be guide strokes, an outline of a desired hair feature, or another form of data, which indicates an orientation. The user input may be, for example, from a mouse, a touchscreen, or metadata, which describes a hair feature. In additional or alternative embodiments, the graphics manipulation application 116 receives the image appearance exemplar 101 or guidance data 102 by communicating, via a data network, suitable signals between a computing device that includes the non-transitory computer-readable medium and a computing device that includes the processing device at which the graphic manipulation application 116 is executed.

Figure 3:
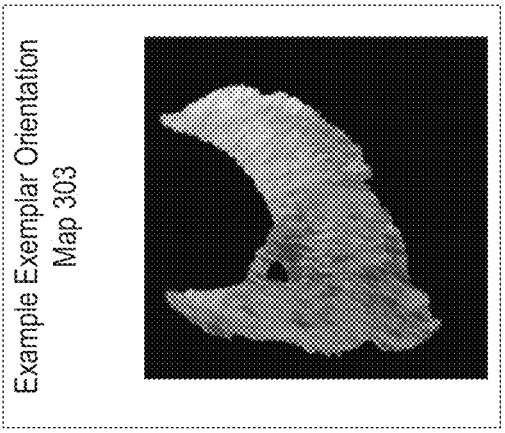
FIG. 3 depicts examples of guidance data and corresponding orientation maps used in the process of FIG. 2, according to certain embodiments of the present disclosure.
Figure 3:
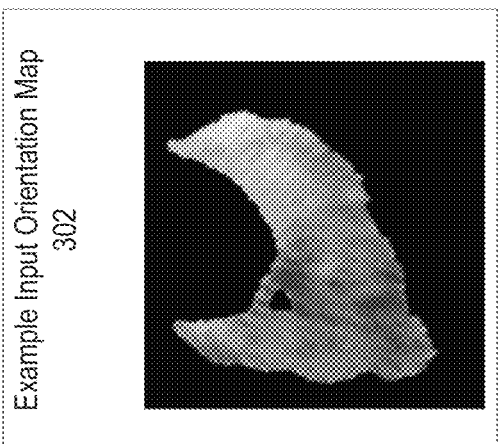
Figure 3:
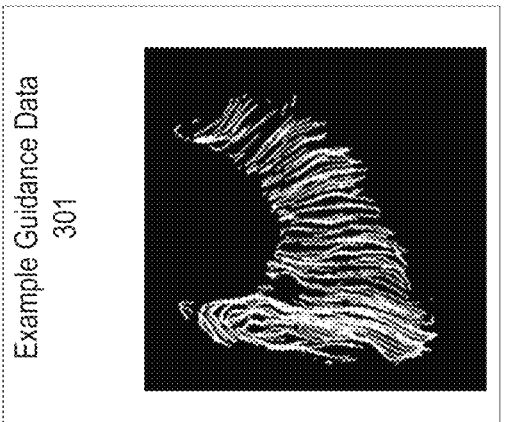

FIG. 3 depicts an embodiment of guidance data 102 with an example guidance data 301 that is accessed at block 202. Any suitable method of indicating orientation of a structure in an image can create, specify, or otherwise provide the guidance data 102 to the graphic manipulation application 116. In some embodiments, the graphic manipulation application 116 receives the guidance data 102 as user input guide strokes. In additional or alternative embodiments, the graphic manipulation application 116 receives the guidance data 102 via user inputs that define an outline of a desired hair feature.

Returning to FIG. 2, at block 204, the process 200 involves transforming the guidance data 102 into input orientation map 117. In some embodiments, this involves applying a neural network, such as the orientation map generation network 105, to the guidance data 102. One or more computing devices execute program code from the graphics manipulation application 116 to implement block 204. For instance, the graphic manipulation application 116 applies orientation map generation network 105 to the guidance data 102 and generates an input orientation map 117. For example, the trained orientation map generation network 105 may use the guidance data 102 and represent the structure with an orientation field that encodes the orientation of hair strands. The orientation map generation network 105 may estimate intermediary orientations between locations of discrete guidance data 102. The orientation map generation network 105 may also use other methods to generate input orientation map 117 from guidance data 102.

FIG. 3 also depicts an example of an input orientation map 117 illustrated as an example input orientation map 302 that is generated at block 204 from the guidance data 102 that is accessed at block 202. In some embodiments, the input orientation map 117 is generated by applying edge detection to the guidance data 102. For example, the edge detection may identify edge information of guidance data 102 that is represented as guide strokes. Detection of the edges may involve an edge detection algorithm, which is well-known in the art. The orientation map generation network 105 may apply various filters to the identified edges to remove noise from the guidance data 102. The orientation map generation network 105 extracts detailed structure information from guidance data 102 by representing a particular structure with an orientation field that encodes the orientation of hair strands. In some embodiments, the orientation map generation network 105 may estimate orientation data by pixel-wise orientation estimation, interpolation, or a similar process.

Returning to FIG. 2 at block 206, the process 200 involves matching the input orientation map 117 that is generated at block 204 to an exemplar orientation map 118 of higher resolution than the input orientation map 117. One or more computing devices execute program code from the graphics manipulation application 116 to implement block 206. For instance, the orientation matching function 106 compares the input orientation map 117 to one or more exemplar orientation maps 118 stored in exemplar orientation map database 109 using one or more criteria suitable for orientation map comparison. In some embodiments, the exemplar orientation map database 109 is remotely connected to the graphics manipulation application 116. In additional or alternative embodiments, a portion or all of exemplar orientation map database 109 may be included internally to the graphics manipulation application 116.

In some embodiments, the orientation matching function 106 matches an input orientation map 117 to the most similar exemplar orientation map 118 based on pixel-wise comparison of orientation channel information. In additional or alternative embodiments, the orientation matching function 106 uses multiple criteria to determine the most similar exemplar orientation map 118 to the input orientation map 117.

FIG. 3 also depicts an example of an exemplar orientation map 118 illustrated as example exemplar orientation map 303 that is generated synthetically as part of a large set of synthetic data. Advantages of synthetically generating exemplar orientation maps 118 of desired hair features are predictability of external factors. For example, controlling many variations of viewpoint and hair feature style allows a large data set to be created with detailed orientation information. Additionally, synthetic generation of exemplar orientation maps 118 provides a more accurate network because orientation data is not skewed by noise information such as variations in length, lighting, and other factors.

Returning to FIG. 2, at block 208 the process involves generating the desired hair feature by applying color information from the image appearance exemplar 101 to orientation data that is obtained from or generated with the exemplar orientation map 118. For example, the image synthesis network 107 receives at least an image appearance exemplar 101 and an exemplar orientation map 118. The graphic manipulation application 116 uses the image synthesis network 107 to apply the color information from the image appearance exemplar 101 to orientation data from the exemplar orientation map 118. In some embodiments, the image synthesis network 107 uses multiple channels including three channels of RGB color information and an additional channel containing orientation information. Other channels for color or orientation information may also be used by image synthesis network 107.

In some embodiments, applying the color information of the appearance exemplar to the exemplar orientation map involves various combination operations with respect to feature vectors representing the exemplar orientation map 118, the image appearance exemplar 101, and an appearance orientation map generated from the image appearance exemplar 101. For instance, the graphic manipulation application 116 provides an exemplar orientation map 118, which is retrieved from the exemplar orientation map database 109 at block 206, as an input to an image synthesis network 107 used to generate a desired hair image. The image synthesis network 107 also receives, as inputs, an image appearance exemplar 101 and a corresponding appearance orientation map computed from the image appearance exemplar 101. For instance, given a color facial hair image, its corresponding orientation map can be generated with an image gradient computation.

Continuing with this example, the graphic manipulation application 116 applies the image synthesis network 107 to these inputs and thereby encodes the exemplar orientation map 118 into one or more desired orientation feature vector, the appearance orientation map into an appearance orientation feature vector, and the image appearance exemplar 101 into an appearance feature vector. The image synthesis network 107 also performs a subtraction operation between the desired orientation feature vector representing the exemplar orientation map 118 and the appearance orientation feature vector representing the appearance orientation map. The difference resulting from the subtraction operation can be considered as the difference between the image appearance exemplar 101 and the desired hair image. The image synthesis network 107 generates an output feature vector by adding a difference from the subtraction operation to the appearance feature vector. The image synthesis network 107 decodes the output feature vector into image content, such as the output synthesized image 115, that depicts the desired hair feature.

In additional or alternative embodiments, applying the color information from the image appearance exemplar 101 involves a patch-based synthesis method. For instance, the graphic manipulation application 116 generates patch feature vectors from patches selected from the exemplar orientation map 118. Generating each patch feature vector involves performing a subtraction operation between the appearance orientation feature vector and a respective feature vector into which a given patch from the exemplar orientation map is encoded by the image synthesis network 107. A given patch feature vector is generated by adding a difference from the subtraction operation to the appearance feature vector. The image synthesis network 107 decodes the patch feature vectors into image patches, and the graphic manipulation application 116 combines the image patches into the desired hair feature. The graphic manipulation application 116 may combine multiple output patches, which can be overlapping, to form output synthesized image 115 having a high-resolution.

At block 210, the process involves outputting the output synthesized image 115 to a presentation device 119. A presentation device 119 can include any device or group of devices suitable for providing visual, auditory, or other suitable sensory output. Non-limiting examples of the presentation device 119 include a touchscreen, a monitor, a speaker, a separate mobile computing device, subsequent graphics applications, etc.

FIG. 3, as discussed previously demonstrates non-limiting visual examples of guidance data 102 illustrated by example guidance data 301, input orientation maps 117 illustrated by example input orientation map 302, and exemplar orientation maps 118 illustrated by example exemplar orientation map 303.

Figure 4:
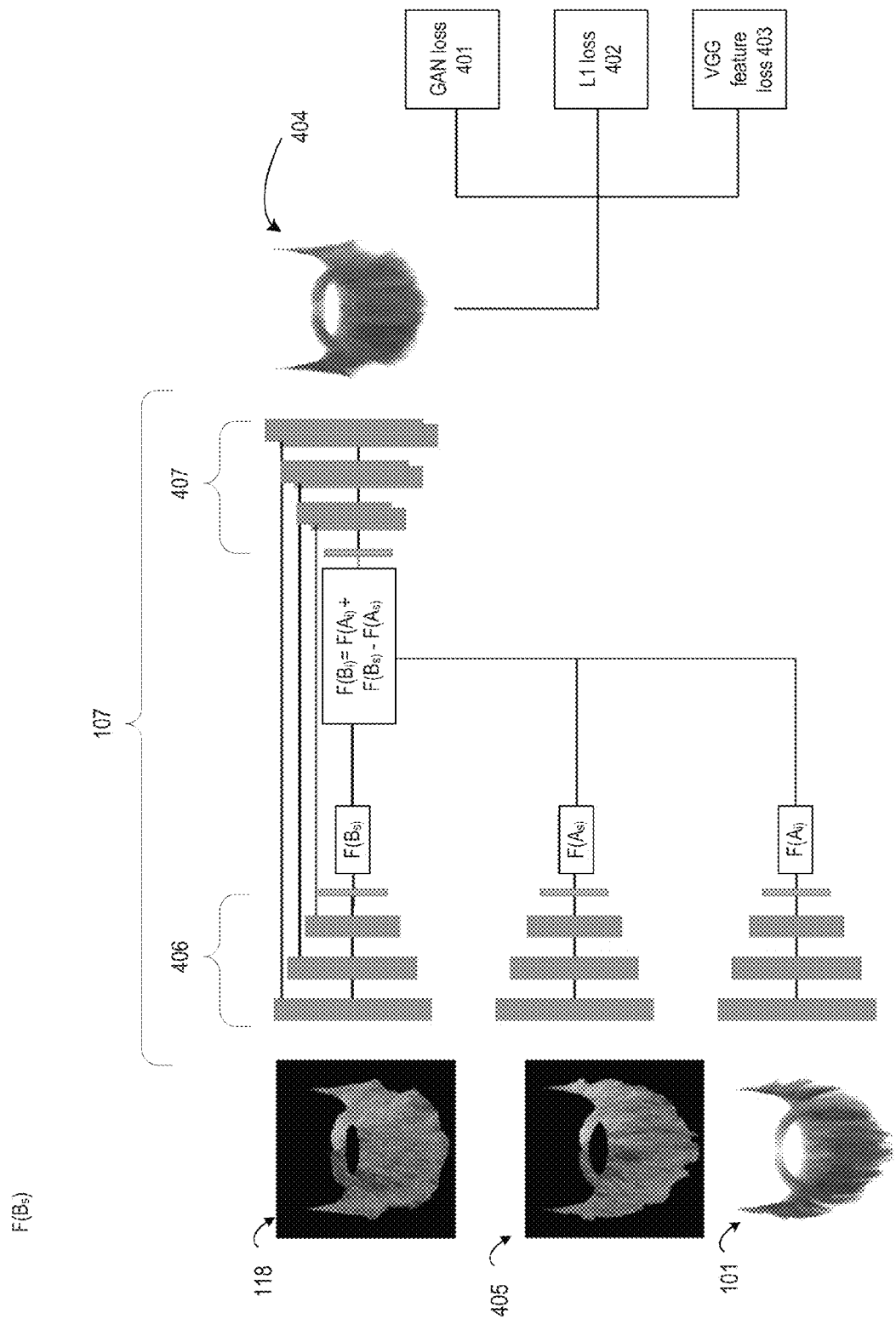
FIG. 4 depicts an example of the image synthesis neural network of FIG. 1 generating image content with synthetic hair features, according to certain embodiments of the present disclosure.

FIG. 4 depicts an example of an image synthesis network 107 for generating image content with synthetic hair features. In this example, the image synthesis network 107 is a neural network that receives image appearance exemplar 101 (represented as term $F(A_i)$), a corresponding appearance orientation map 405 computed from the image appearance exemplar 101 (represented as term $F(A_s)$) that identifies or otherwise indicates an appearance structure, and the exemplar orientation map 118 obtained using guidance data 102. For instance, features $F(A_i)$ are extracted from the image appearance exemplar 101 and features $F(A_s)$ are extracted from the corresponding orientation map.

The image synthesis network 107 includes a set of encoding layers 406 for encoding the exemplar orientation map 118, the image appearance exemplar 101, and the appearance orientation map 405. The image synthesis network 107 performs a combination operation on a set of feature vectors generated by encoding the exemplar orientation map 118, the image appearance exemplar 101, and the appearance orientation map 405. In some embodiments, the combination operation is defined by adding, to a feature vector $F(A_i)$ generated by encoding the image appearance exemplar 101, a result of a subtraction operation. The subtraction operation finds a mathematical difference between a feature vector $F(A_s)$ generated by encoding the appearance orientation map 405 and a feature vector $F(B_s)$ generated by encoding the exemplar orientation map 118. This combination operation may be represented as $F(B_i)=F(A_i)+F(B_s)-F(A_s)$. A set of decoding layers 407 in the image synthesis network 107 decodes the resulting feature vector $F(B_i)$, which includes information for both the appearance and orientation of the desired facial hair image 404 (e.g., the output synthesized image 115 from FIG. 1).

In embodiments involving a training environment, as depicted in FIG. 4, $F(B_i)$ includes one or more feature vectors that can be decoded into an output synthesized image 115. The training system 108 computes one or more loss metrics by evaluating $F(B_i)$ against desired facial hair image 404. In the example depicted in FIG. 4, the training system 108 uses three loss metrics (a GAN loss 401, an L1 loss 402, and a VGG network feature loss 404) for training the image synthesis network 107.

In some embodiments, the training system 108 computes a GAN loss 401 using a generator-discriminator model. The GAN loss 401 indicates a difference between the desired facial hair image 404 and the output synthesized image 115 (shown as $F(B_i)$ in FIG. 4.) The GAN loss 401 is captured by monitoring the results of these identifications and the comparisons as a percentage of correct identifications. In additional or alternative embodiments, the GAN loss 401 could be computed using a convolutional neural network or other deep learning method. The training system 108 identifies, from the GAN loss 401, the synthesized image as a real image or a synthetic image. For instance, a GAN loss 401 exceeding a threshold GAN loss could indicate a synthetic image. The threshold GAN loss can be user-specified, learned from training images with labeled "real" or "synthetic" images, or some combination thereof. The training system 108 updates the image synthesis network 107 based on the GAN loss 401. For instance, the training system 108 performs an iterative process for reducing the GAN loss 401 by modifying one or more features of the image synthesis network 107 (e.g., a number of nodes in the image synthesis network 107, a number of layers in the image synthesis network 107, connections between layers in the image synthesis network 107, etc.). The iterative process terminates based on the GAN loss 401 (or a combined loss that uses the GAN loss 401 as a component) falling below a threshold.

In additional or alternative embodiments, the training system 108 computes an L1 loss 402 from a pixel-wise comparison of RGB color information (or other suitable color information) between the output synthesized image 115 F $(B_i)$ and the desired facial hair image 404. The L1 loss 402 may be a pixel-wise distance measurement between the RGB images. The training system 108 identifies, from the L1 loss 403, which indicates the accuracy of the output synthesized image 115 decoded from F $(B_i)$ relative to the color information per pixel. For instance, an L1 loss 402 exceeding a threshold L1 loss could indicate that the color information from the image appearance exemplar 101 was not modified properly by the image synthesis network 107. A significantly high L1 loss would indicate that the image synthesis engine is incorrectly depicting color information in the output synthesis image 115. The threshold L1 loss can be user-specified, learned from training images with labeled "Optimal L1 Loss" indicating image comparisons with appropriate levels of L1 loss. Additionally, the training images may include "Excessive L1 Loss" images which indicate image comparisons with color information that is not acceptable output, or some combination thereof. The training system 108 updates the image synthesis network 107 based on the L1 loss 402. For instance, the training system 108 performs an iterative process for reducing the L1 loss 402 by modifying one or more features of the image synthesis network 107 (e.g., a number of nodes in the image synthesis network 107, a number of layers in the image synthesis network 107, connections between layers in the image synthesis network 107, etc.). The iterative process terminates based on the L1 loss 402 (or a combined loss that uses the L1 loss 402 as a component) falling below a threshold.

In additional or alternative embodiments, the training system 108 computes a VGG network feature loss 403. For instance, the training system 108 uses a convolutional neural network (or other suitable model) to measure variations between identified features in the desired facial hair image 404 with features in the output synthesized image 115. In some embodiments, the training system 108 computes the VGG network feature loss 403 by capturing image content and structural information useful for classification of image features. For a non-limiting example, if the desired facial hair image 404 has a particularly "curly" appearance, the VGG network feature loss 403 may identify one or more hair strands in a curl which can be identified as a feature. The VGG network feature loss 403 may identify hair strands in a curl in output synthesized image 115 decoded from $F(B_i)$ and compare the identified features to the features from the desired facial hair image 404. If, for example, two hair strands of curls were not present in output synthesized image 115 decoded from $F(B_i)$, but were present in the facial hair image 404, then the missing features would be included in VGG network feature loss 403. A particular implementation may compare features from the desired facial hair image 404 with output synthesized image 115 decoded from $F(B_i)$. The difference may be defined as feature loss. In additional or alternative embodiments, features may be derived by the user, or using other processes.

The training system 108 updates the image synthesis network 107 based on the VGG network feature loss 403. For instance, the training system 108 performs an iterative process for reducing the VGG network feature loss 403 by modifying one or more features of the image synthesis network 107 (e.g., a number of nodes in the image synthesis network 107, a number of layers in the image synthesis network 107, connections between layers in the image synthesis network 107, etc.). The iterative process terminates based on the VGG network feature loss 403 (or a combined loss that uses the VGG network feature loss 403 as a component) falling below a threshold.

For illustrative purposes, FIG. 4 is described above wither respect to facial fair. But other implementations similar to FIG. 4 can be used for other hair features.

Figure 5:
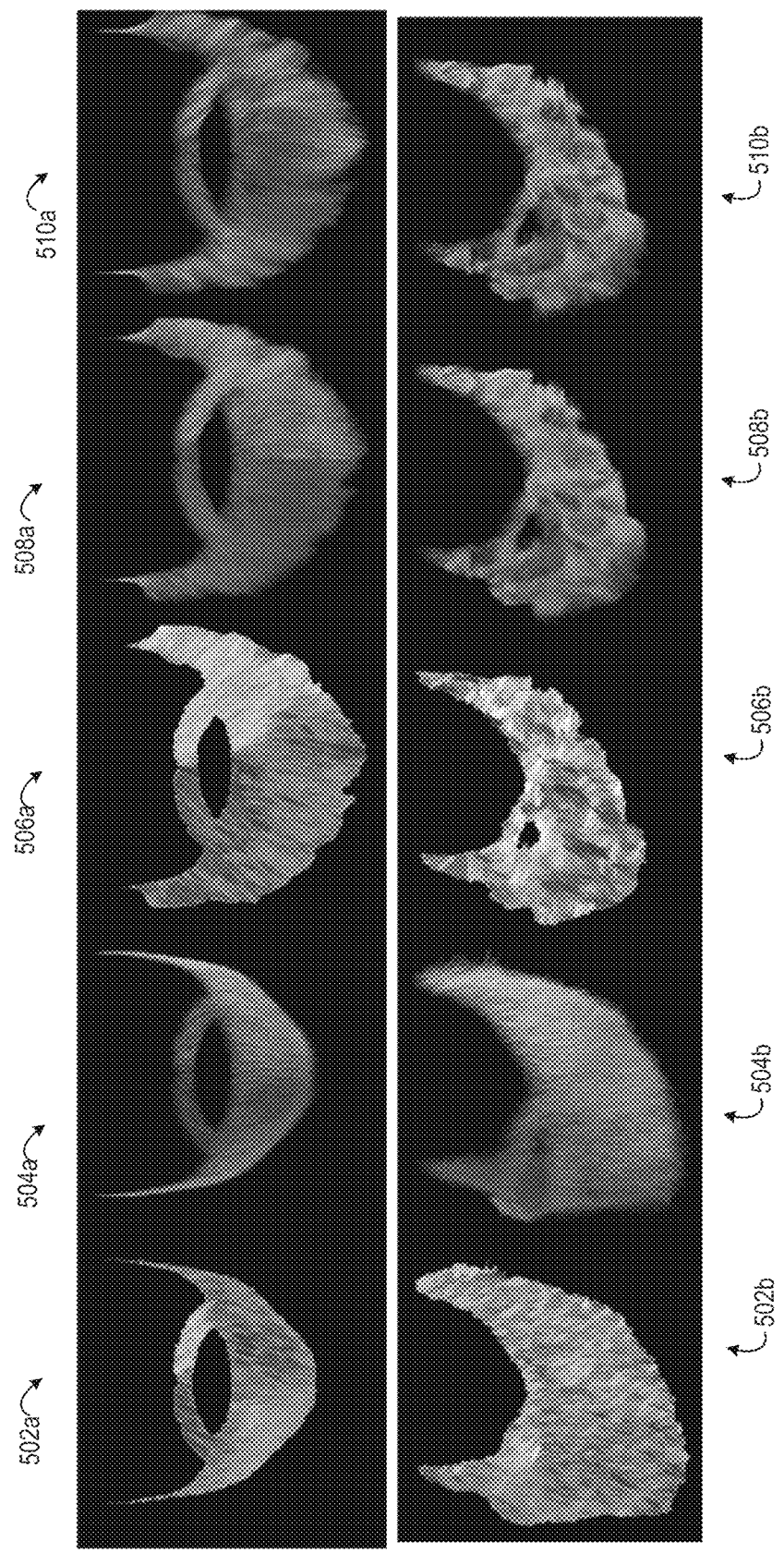
FIG. 5 depicts experimental examples of synthetic hair features generated using the system of FIG. 1, according to certain embodiments of the present disclosure.

FIG. 5 depicts experimental examples of synthetic hair features generated using the system of FIG. 1, according to certain embodiments of the present disclosure. In this example, appearance orientation maps 502a, 502b are generated from image appearance exemplars 504a, 504b, respectively, using one or more suitable image gradient computation operations. Exemplar orientation maps 506a, 506b are selected, generated, or otherwise obtained based on guidance input as described above with respect to FIGS. 1 and 2.

The appearance orientation map 502a, the corresponding image appearance exemplar 504a, and the exemplar orientation map 506a are used to generate a synthesized facial hair image 508a as described above with respect to FIG. 4. For comparison purposes, FIG. 5 depicts a desired facial hair image 510a.

Likewise, the appearance orientation map 502b, the corresponding image appearance exemplar 504b, and the exemplar orientation map 506b are used to generate a synthesized facial hair image 508b as described above with respect to FIG. 4. For comparison purposes, FIG. 5 depicts a desired facial hair image 510b.

Figure 6:
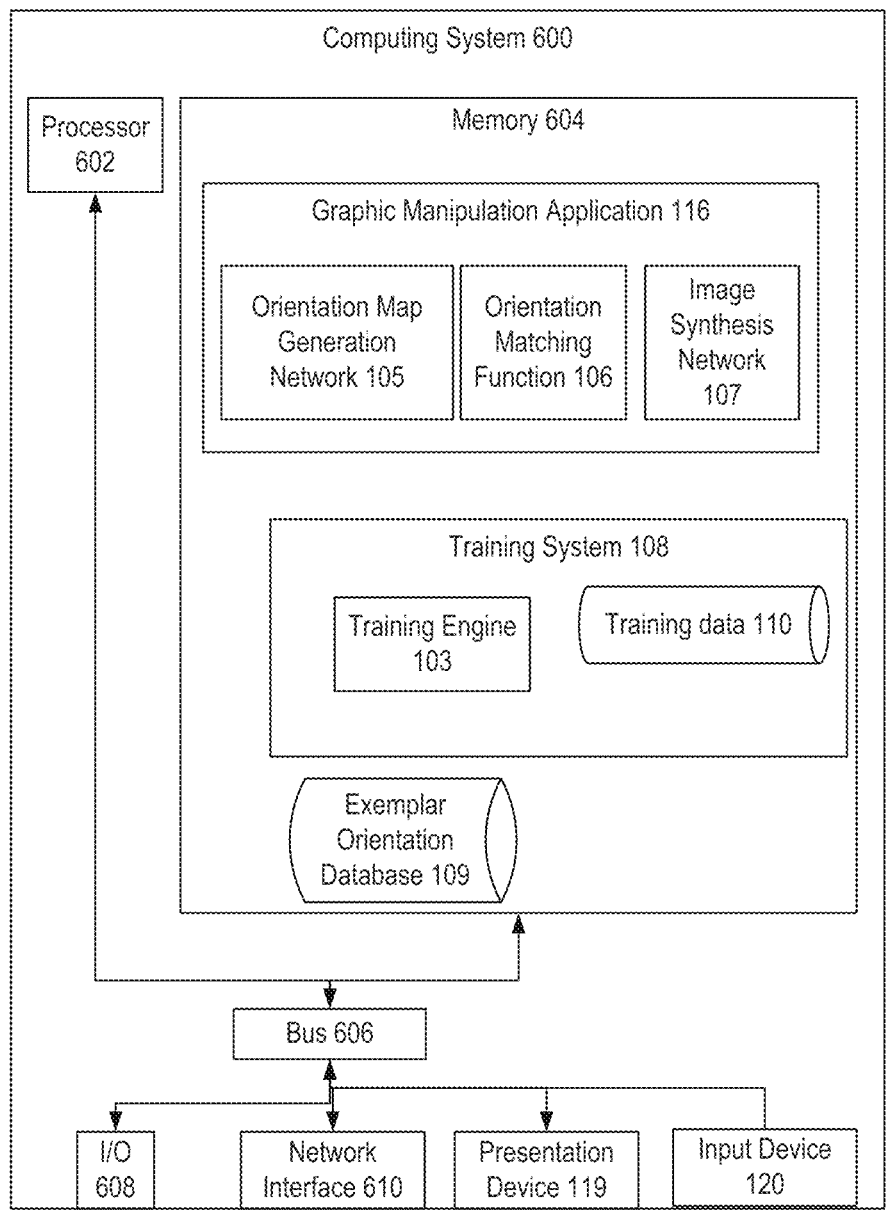
FIG. 6 depicts an example of an implementation of the computing system of FIG. 1, according to certain embodiments of the present disclosure.

Any suitable computing system or group of computing systems can be used for performing the operations described herein. For example, FIG. 6 depicts an example of a computing system 600 that can implement the computing environment of FIG. 1. In some embodiments, the computing system 600 includes a processing device that executes the graphics manipulation application 116 as well as any applications for training one or more neural network models, a memory that stores various graphics data, an input device 120 (e.g., a mouse, a keyboard, a touchpad, a touchscreen, etc.), and a presentation device 119 that displays graphical content (e.g., image appearance exemplar 101, the guidance data 102, the input orientation map 117, the exemplar orientation map 118, etc.). In other embodiments, different computing systems (e.g., the training system 108) having devices similar to those depicted in FIG. 6 (e.g., a processor, a memory, etc.) perform one or more of executing the graphics manipulation application 116, storing the graphics data, receiving input, training one or more neural network models, and displaying the various outputs.

The depicted example of a computing system 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

The memory device 604 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 600 may also include a number of external or internal devices, an input device 120, a presentation device 119, or other input or output devices. For example, the computing environment 100 is shown with one or more input/output ("I/O") interfaces 608. An I/O interface 608 can receive input from input devices or provide output to output devices. One or more buses 606 are also included in the computing system 600. The bus 606 communicatively couples one or more components of a respective one of the computing system 600.

The computing system 600 executes program code that configures the processor 602 to perform one or more of the operations described herein. The program code includes, for example, the graphics manipulation application 116 or other suitable applications that perform one or more operations described herein (e.g., one or more training engines executed by a training system 108). The program code may be resident in the memory device 604 or any suitable computer-readable medium and may be executed by the processor 602 or any other suitable processor. In some embodiments, all modules in the graphics manipulation application 116 (e.g., the image synthesis network 107, the orientation map generation network 105, the orientation matching function 106, etc.) are stored in the memory device 604, as depicted in FIG. 6. In additional or alternative embodiments, one or more of these modules from the graphics manipulation application 116 are stored in different memory devices of different computing systems.

In some embodiments, the computing system 600 also includes a network interface device 610. The network interface device 610 includes any device or group of devices suitable for establishing a wired or wireless data connection to one or more data networks. Non-limiting examples of the network interface device 610 include an Ethernet network adapter, a modem, and/or the like. The computing system 600 is able to communicate with one or more other computing devices (e.g., a computing device executing a graphics manipulation application 116) via a data network using the network interface device 610.

In some embodiments, the computing system 600 also includes the input device 120 and the presentation device 119 depicted in FIG. 6. An input device 120 can include any device or group of devices suitable for receiving visual, auditory, or other suitable input that controls or affects the operations of the processor 602. Non-limiting examples of the input device 120 include a touchscreen, a mouse, a keyboard, a microphone, a separate mobile computing device, etc. A presentation device 119 can include any device or group of devices suitable for providing visual, auditory, or other suitable sensory output. Non-limiting examples of the presentation device 119 include a touchscreen, a monitor, a speaker, a separate mobile computing device, etc.

Although FIG. 6 depicts the input device 120 and the presentation device 119 as being local to the computing device that executes the graphic manipulation application 116, other implementations are possible. For instance, in some embodiments, one or more of the input device 120 and the presentation device 119 can include a remote client-computing device that communicates with the computing system 600 via the network interface device 610 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:

accessing, by a processing device and from a memory device, guidance data identifying a desired hair feature and an appearance exemplar, wherein the appearance exemplar comprises image data that includes color information for the desired hair feature;

transforming, by the processing device, the guidance data into an input orientation map, wherein the input orientation map comprises data indicating, for multiple pixels corresponding to the guidance data identifying the desired hair feature, respective directions of orientation for the desired hair feature;

matching, by the processing device, the input orientation map to an exemplar orientation map having a higher resolution than the input orientation map, wherein the exemplar orientation map comprises data indicating, for multiple pixels corresponding to an image of hair, respective directions of orientation for a respective portion of the hair;

generating, by the processing device, the desired hair feature by applying the color information from the appearance exemplar to the exemplar orientation map; and outputting, by the processing device, the desired hair feature at a presentation device.

2. The method of claim 1, wherein applying the color information of the appearance exemplar to the exemplar orientation map comprises:

generating an appearance orientation map from the appearance exemplar, wherein the appearance orientation map comprises data indicating, for multiple pixels corresponding to the image data that includes the color information for the desired hair feature, respective directions of orientation for the image data that includes the color information for the desired hair feature;

encoding, with an image synthesis neural network, the exemplar orientation map, the appearance orientation map, and the appearance exemplar into feature vectors;

performing a subtraction operation between a first one of the feature vectors representing the exemplar orientation map and a second one of the feature vectors representing the appearance orientation map;

generating an output feature vector by adding a difference from the subtraction operation to a third one of the feature vectors representing the appearance exemplar; and decoding, with the image synthesis neural network, the output feature vector into the desired hair feature.

3. The method of claim 2, further comprising training, by the processing device or another processing device, the image synthesis neural network, wherein training the image synthesis neural network comprises:

selecting a training input orientation map and a training appearance exemplar, wherein the training input orientation map comprises data indicating directions of orientation for graphical content depicting hair, wherein the training appearance exemplar comprises graphical data depicting one or more hair colors;

iteratively performing training operations comprising:
generating a training hair feature by matching a training exemplar orientation map to the training input orientation map and applying color information from the training appearance exemplar to training orientation data obtained from the training exemplar orientation map, wherein the training hair feature comprises graphical data depicting a set of colored hair, wherein the training exemplar orientation map comprises data indicating, for multiple pixels corresponding to a training image of hair, respective directions of orientation for a respective portion of the hair depicted in the training image, computing one or more loss metrics indicating a realism of the training hair feature, a color similarity between the training hair feature and an exemplar hair feature comprising image data depicting a different set of colored hair, and a feature similarity between the training hair feature and the exemplar hair feature, and modifying the image synthesis neural network based on the one or more loss metrics;

outputting the image synthesis neural network as modified by the iteratively performed training operations.

4. The method of claim 3, wherein the one or more loss metrics comprise:

a first loss metric indicating the realism of the training hair feature;

a second loss metric indicating the color similarity; and a third loss metric indicating the feature similarity.

5. The method of claim 1, wherein applying the color information of the appearance exemplar to the exemplar orientation map comprises:

generating an appearance orientation map from the appearance exemplar, wherein the appearance orientation map comprises data indicating, for multiple pixels corresponding to the image data that includes the color information for the desired hair feature, respective directions of orientation for the image data that includes the color information for the desired hair feature;

encoding, with an image synthesis neural network, the appearance exemplar into an appearance feature vector, wherein the appearance feature vector is a vector having values representing content of the appearance exemplar, and the appearance orientation map into an appearance orientation feature vector, wherein the appearance orientation feature vector is a vector having values representing content of the appearance orientation map;

generating patch feature vectors from patches from the exemplar orientation map, wherein generating each patch feature vector comprises:
performing a subtraction operation between (i) a respective feature vector into which a patch from the exemplar orientation map is encoded and (ii) the appearance orientation feature vector, and
computing the patch feature vector by adding a difference from the subtraction operation to the appearance feature vector;

decoding, with the image synthesis neural network, the patch feature vectors into image patches; and combining the image patches into the desired hair feature.

6. The method of claim 1, further comprising:

receiving, by the processing device, a target image;

receiving, by the processing device and from an input device, guidance input on the target image that defines a shape of the desired hair feature; and generating, by the processing device, the guidance data based on the guidance input.

7. The method of claim 6, wherein outputting the desired hair feature comprises:

modifying the target image to include the desired hair feature; and causing the presentation device to display the target image having the desired hair feature.

8. A system comprising:

a processing device; and a non-transitory computer-readable medium communicatively coupled to the processing device, wherein the processing device is configured to execute program code stored in the non-transitory computer-readable medium and thereby perform operations comprising:

accessing guidance data identifying a desired hair feature and an appearance exemplar, wherein the appearance exemplar comprises image data that includes color information for the desired hair feature, transforming the guidance data into an input orientation map, wherein the input orientation map comprises data indicating, for multiple pixels corresponding to the guidance data identifying the desired hair feature, respective directions of orientation for the desired hair feature, matching the input orientation map to an exemplar orientation map having a higher resolution than the input orientation map, wherein the exemplar orientation map comprises data indicating, for multiple pixels corresponding to an image of hair, respective directions of orientation for a respective portion of the hair, generating the desired hair feature by applying the color information from the appearance exemplar to the exemplar orientation map, and outputting the desired hair feature at a presentation device.

9. The system of claim 8, wherein applying the color information of the appearance exemplar to the exemplar orientation map comprises:

generating an appearance orientation map from the appearance exemplar, wherein the appearance orientation map comprises data indicating, for multiple pixels corresponding to the image data that includes the color information for the desired hair feature, respective directions of orientation for the image data that includes the color information for the desired hair feature;

encoding, with an image synthesis neural network, the exemplar orientation map, the appearance orientation map, and the appearance exemplar into feature vectors;

performing a subtraction operation between a first one of the feature vectors representing the exemplar orientation map and a second one of the feature vectors representing the appearance orientation map;

generating an output feature vector by adding a difference from the subtraction operation to a third one of the feature vectors representing the appearance exemplar; and decoding, with the image synthesis neural network, the output feature vector into the desired hair feature.

10. The system of claim 9, the operations further comprising training the image synthesis neural network, wherein training the image synthesis neural network comprises:

selecting a training input orientation map and a training appearance exemplar, wherein the training input orientation map comprises data indicating directions of orientation for graphical content depicting hair, wherein the training appearance exemplar comprises graphical data depicting one or more hair colors;

iteratively performing training operations comprising:
generating a training hair feature by matching a training exemplar orientation map to the training input orientation map and applying color information from the training appearance exemplar to training orientation data obtained from the training exemplar orientation map, wherein the training hair feature comprises graphical data depicting a set of colored hair, wherein the training exemplar orientation map comprises data indicating, for multiple pixels corresponding to a training image of hair, respective directions of orientation for a respective portion of the hair depicted in the training image, computing one or more loss metrics indicating a realism of the training hair feature, a color similarity between the training hair feature and an exemplar hair feature comprising image data depicting a different set of colored hair, and a feature similarity between the training hair feature and the exemplar hair feature, and modifying the image synthesis neural network based on the one or more loss metrics;

outputting the image synthesis neural network as modified by the iteratively performed training operations.

11. The system of claim 10, wherein the one or more loss metrics comprise:

a first loss metric indicating the realism of the training hair feature;

a second loss metric indicating the color similarity; and a third loss metric indicating the feature similarity.

12. The system of claim 8, wherein applying the color information of the appearance exemplar to the exemplar orientation map comprises:

generating an appearance orientation map from the appearance exemplar, wherein the appearance orientation map comprises data indicating, for multiple pixels corresponding to the image data that includes the color information for the desired hair feature, respective directions of orientation for the image data that includes the color information for the desired hair feature;

encoding, with an image synthesis neural network, the appearance exemplar into an appearance feature vector, wherein the appearance feature vector is a vector having values representing content of the appearance exemplar, and the appearance orientation map into an appearance orientation feature vector, wherein the appearance orientation feature vector is a vector having values representing content of the appearance orientation map;

generating patch feature vectors from patches from the exemplar orientation map, wherein generating each patch feature vector comprises:
performing a subtraction operation between (i) a respective feature vector into which a patch from the exemplar orientation map is encoded and (ii) the appearance orientation feature vector, and
computing the patch feature vector by adding a difference from the subtraction operation to the appearance feature vector;

decoding, with the image synthesis neural network, the patch feature vectors into image patches; and combining the image patches into the desired hair feature.

13. The system of claim 8, the operations further comprising:

receiving a target image;

receiving, from an input device, guidance input on the target image that defines a shape of the desired hair feature; and generating the guidance data based on the guidance input.

14. The system of claim 13, wherein outputting the desired hair feature comprises:

modifying the target image to include the desired hair feature; and causing the presentation device to display the target image having the desired hair feature.

15. A non-transitory computer-readable medium having program code that is stored thereon, the program code executable by one or more processing devices for performing operations comprising:

accessing guidance data identifying a desired hair feature and an appearance exemplar comprising image data that includes color information for the desired hair feature;

transforming the guidance data into an input orientation map, wherein the input orientation map comprises data indicating, for multiple pixels corresponding to the guidance data identifying the desired hair feature, respective directions of orientation for the desired hair feature;

matching the input orientation map to an exemplar orientation map having a higher resolution than the input orientation map, wherein the exemplar orientation map comprises data indicating, for multiple pixels corresponding to an image of hair, respective directions of orientation for a respective portion of the hair;

generating the desired hair feature by applying the color information from the appearance exemplar to the exemplar orientation map; and outputting the desired hair feature at a presentation device.

16. The non-transitory computer-readable medium of claim 15, wherein applying the color information of the appearance exemplar to the exemplar orientation map comprises:

generating an appearance orientation map from the appearance exemplar, wherein the appearance orientation map comprises data indicating, for multiple pixels corresponding to the image data that includes the color information for the desired hair feature, respective directions of orientation for the image data that includes the color information for the desired hair feature;

encoding, with an image synthesis neural network, the exemplar orientation map, the appearance orientation map, and the appearance exemplar into feature vectors;

performing a subtraction operation between a first one of the feature vectors representing the exemplar orientation map and a second one of the feature vectors representing the appearance orientation map;

generating an output feature vector by adding a difference from the subtraction operation to a third one of the feature vectors representing the appearance exemplar; and decoding, with the image synthesis neural network, the output feature vector into the desired hair feature.

17. The non-transitory computer-readable medium of claim 16, the operations further comprising training the image synthesis neural network, wherein training the image synthesis neural network comprises:

selecting a training input orientation map and a training appearance exemplar, wherein the training input orientation map comprises data indicating directions of orientation for graphical content depicting hair, wherein the training appearance exemplar comprises graphical data depicting one or more hair colors;

iteratively performing training operations comprising:
  generating a training hair feature by matching a training exemplar orientation map to the training input orientation map and applying color information from the training appearance exemplar to training orientation data obtained from the training exemplar orientation map, wherein the training hair feature comprises graphical data depicting a set of colored hair, wherein the training exemplar orientation map comprises data indicating, for multiple pixels corresponding to a training image of hair, respective directions of orientation for a respective portion of the hair depicted in the training image, computing one or more loss metrics indicating a realism of the training hair feature, a color similarity between the training hair feature and an exemplar hair feature comprising image data depicting a different set of colored hair, and a feature similarity between the training hair feature and the exemplar hair feature, and modifying the image synthesis neural network based on the one or more loss metrics;

outputting the image synthesis neural network as modified by the iteratively performed training operations.

18. The non-transitory computer-readable medium of claim 17, wherein the one or more loss metrics comprise:

a first loss metric indicating the realism of the training hair feature;

a second loss metric indicating the color similarity; and a third loss metric indicating the feature similarity.

19. The non-transitory computer-readable medium of claim 15, wherein applying the color information of the appearance exemplar to the exemplar orientation map comprises:

generating an appearance orientation map from the appearance exemplar, wherein the appearance orientation map comprises data indicating, for multiple pixels corresponding to the image data that includes the color information for the desired hair feature, respective directions of orientation for the image data that includes the color information for the desired hair feature;

encoding, with an image synthesis neural network, the appearance exemplar into an appearance feature vector, wherein the appearance feature vector is a vector having values representing content of the appearance exemplar, and the appearance orientation map into an appearance orientation feature vector, wherein the appearance orientation feature vector is a vector having values representing content of the appearance orientation map;

generating patch feature vectors from patches from the exemplar orientation map, wherein generating each patch feature vector comprises:
  performing a subtraction operation between (i) a respective feature vector into which a patch from the exemplar orientation map is encoded and (ii) the appearance orientation feature vector, and
  computing the patch feature vector by adding a difference from the subtraction operation to the appearance feature vector;

decoding, with the image synthesis neural network, the patch feature vectors into image patches; and combining the image patches into the desired hair feature.

20. The non-transitory computer-readable medium of claim 15, the operations further comprising:

receiving a target image;

receiving, from an input device, guidance input on the target image that defines a shape of the desired hair feature;

generating the guidance data based on the guidance input;

modifying the target image to include the desired hair feature; and causing the presentation device to display the target image having the desired hair feature.

* * * * *